US 9,998,168 B2

United States Patent
Khlat

(10) Patent No.: US 9,998,168 B2
(45) Date of Patent: Jun. 12, 2018

(54) TUNABLE RADIO FREQUENCY FILTERING CIRCUITRY

(71) Applicant: Qorvo US, Inc., Greensboro, NC (US)

(72) Inventor: Nadim Khlat, Cugnaux (FR)

(73) Assignee: Qorvo US, Inc., Greensboro, NC (US)

( * ) Notice: Subject to any disclaimer, the term of this patent is extended or adjusted under 35 U.S.C. 154(b) by 0 days. days.

(21) Appl. No.: 15/231,038

(22) Filed: Aug. 8, 2016

(65) Prior Publication Data

US 2017/0085290 A1    Mar. 23, 2017

Related U.S. Application Data

(60) Provisional application No. 62/220,271, filed on Sep. 18, 2015.

(51) Int. Cl.
  *H04B 1/40*   (2015.01)
  *H04L 5/00*   (2006.01)
  *H04L 5/14*   (2006.01)
  *H04B 1/00*   (2006.01)

(52) U.S. Cl.
  CPC ............. *H04B 1/40* (2013.01); *H04B 1/0057* (2013.01); *H04L 5/0041* (2013.01); *H04L 5/14* (2013.01)

(58) Field of Classification Search
  None
  See application file for complete search history.

(56) References Cited

U.S. PATENT DOCUMENTS

| | | | |
|---|---|---|---|
| 2002/0158708 A1* | 10/2002 | Inoue .................. | H03H 9/0576 333/133 |
| 2005/0212612 A1* | 9/2005 | Kawakubo ............. | H03H 9/542 331/117 R |
| 2006/0139120 A1* | 6/2006 | Yamaguchi .......... | H03H 9/6483 333/133 |
| 2011/0199168 A1* | 8/2011 | Kadota .............. | H03H 9/02559 333/195 |

OTHER PUBLICATIONS

Bradley, P. et al., "A Generic 2.0×2.5 mm$^2$ UMTS FBAR Duplexer Based on 8-pole Near-Elliptic Filters," 2009 IEEE International Ultrasonics Symposium Proceedings, Sep. 2009, IEEE, pp. 839-842.

* cited by examiner

*Primary Examiner* — Alejandro Rivero
(74) *Attorney, Agent, or Firm* — Withrow & Terranova, P.L.L.C.

(57) ABSTRACT

Radio frequency (RF) filtering circuitry includes transmit signal filtering circuitry and receive signal filtering circuitry. The RF filtering circuitry is configured to separate RF transmit signals within a transmit signal frequency band from RF receive signals within a receive signal frequency band. A tunable impedance is coupled to the transmit signal filtering circuitry and adjusted such that the attenuation of the RF transmit signals is greater in a first portion of the receive signal frequency band than in a second portion of the receive signal frequency band in a first mode of operation, and greater in the second portion of the receive signal frequency band than in the first portion of the receive signal frequency band in a second mode of operation.

12 Claims, 8 Drawing Sheets

TUNABLE RADIO FREQUENCY FILTERING CIRCUITRY

RELATED APPLICATIONS

This application claims the benefit of U.S. provisional patent application No. 62/220,271, filed Sep. 18, 2015, the disclosure of which is incorporated herein by reference in its entirety.

FIELD OF THE DISCLOSURE

The present disclosure relates to RF filtering circuitry, and in particular to RF filtering circuitry with improved attenuation of radio frequency (RF) transmit signals in an RF receive signal path.

BACKGROUND

It is often desirable for wireless communications devices to operate in a full-duplex mode of operation in which radio frequency (RF) signals are simultaneously transmitted and received. Further, it is often desirable for wireless communications devices to operate in a carrier aggregation mode of operation in which RF signals are simultaneously transmitted and/or received over multiple RF frequency bands. Supporting full-duplex and carrier aggregation modes often requires specialized RF filtering circuitry for appropriately separating and combining various RF signals. FIG. 1 shows conventional RF front end circuitry 10 capable of both full-duplex and carrier aggregation modes of operation.

The conventional RF front end circuitry 10 includes an antenna 12, a diplexer 14, a first duplexer 16A, and a second duplexer 16B. The diplexer 14 includes a diplexer common node 18A, a first diplexer input/output node 18B, and a second diplexer input/output node 18C. The diplexer common node 18A is coupled to the antenna 12. The first diplexer input/output node 18B is coupled to the first duplexer 16A. The second diplexer input/output node 18C is coupled to the second duplexer 16B. The diplexer 14 is configured to pass RF transmit signals and RF receive signals within a first RF frequency band between the diplexer common node 18A and the first diplexer input/output node 18B while attenuating signals outside of the first RF frequency band in this signal path. Further, the diplexer 14 is configured to pass RF transmit signals and RF receive signals within a second RF frequency band between the diplexer common node 18A and the second diplexer input/output node 18C while attenuating signals outside of the second RF frequency band in this signal path. Accordingly, those skilled in the art will appreciate that the diplexer 14 enables the simultaneous transmission and/or reception of RF signals within the first RF frequency band and the second RF frequency band (i.e., carrier aggregation).

The first duplexer 16A includes a first duplexer common node 20A, a first duplexer transmit signal node 20B, and a first duplexer receive signal node 20C. The first duplexer common node 20A is coupled to the first diplexer input/output node 18B of the diplexer 14. The first duplexer 16A is configured to pass RF transmit signals within the first RF frequency band from the first duplexer transmit signal node 20B to the first duplexer common node 20A while attenuating other signals. Further, the first duplexer 16A is configured to pass RF receive signals from the first duplexer common node 20A to the first duplexer receive signal node 20C while attenuating other signals. Accordingly, those skilled in the art will appreciate that the first duplexer 16A enables the simultaneous transmission and reception of RF signals within the first RF frequency band (i.e., full duplex).

The second duplexer 16B includes a second duplexer common node 22A, a second duplexer transmit signal node 22B, and a second duplexer receive signal node 22C. The second duplexer common node 22A is coupled to the second diplexer input/output node 18C. The second duplexer 16B is configured to pass RF transmit signals within the second RF frequency band from the second duplexer transmit signal node 22B to the second duplexer common node 22A while attenuating other signals. Further, the second duplexer 16B is configured to pass RF receive signals within the second RF frequency band between the second duplexer common node 22A and the second duplexer receive signal node 22C. Accordingly, those skilled in the art will appreciate that the second duplexer 16B enables the simultaneous transmission and reception of RF signals within the second RF frequency band (i.e., full duplex).

The first duplexer 16A and the second duplexer 16B must be designed in order to appropriately isolate RF transmit signals from RF receive signals in the first RF frequency band and the second RF frequency band, respectively. FIG. 2 shows a conventional duplexer 24 that may be used for the first duplexer 16A and the second duplexer 16B. The conventional duplexer 24 includes a duplexer common node 26A, a duplexer transmit signal node 26B, and a duplexer receive signal node 26C. Transmit signal filtering circuitry 28 is coupled in series with a transmit signal path coupler inductor L_CTX between the duplexer transmit signal node 26B and the duplexer common node 26A, such that the transmit signal path coupler inductor L_CTX is coupled to the duplexer transmit signal node 26B and the transmit signal filtering circuitry 28 is coupled between the transmit signal path coupler inductor L_CTX and the duplexer common node 26A. Receive signal filtering circuitry 30 is coupled in series with a receive signal path coupler inductor L_CRX between the duplexer receive signal node 26C and the duplexer common node 26A such that the receive signal path coupler inductor L_CRX is coupled to the duplexer receive signal node 26C and the receive signal filtering circuitry 30 is coupled between the receive signal path coupler inductor L_CRX and the duplexer common node 26A.

The transmit signal filtering circuitry 28 includes a number of acoustic resonators coupled together in a ladder configuration on a transmit signal filtering circuitry acoustic die 32. Specifically, the transmit signal filtering circuitry acoustic die 32 includes a series transmit signal filter path 34 coupled between the transmit signal path coupler inductor L_CTX and the duplexer common node 26A, and a number of shunt transmit signal filter paths 36 coupled between the series transmit signal filter path 34 and ground. The series transmit signal filter path 34 includes a number of transmit signal series resonators 38 each including an input node and an output node and coupled in series such that an input node of a first one of the transmit signal series resonators 38A is coupled to the transmit signal path coupler inductor L_CTX, an output node of a last one of the transmit signal series resonators 38N is coupled to the duplexer common node 26A, and a connection between each adjacent pair of the transmit signal series resonators 38 provides a series intermediate node 40, such that the number of series intermediate nodes 40 is one less than the number of transmit signal series resonators 38.

Each one of the shunt transmit signal filter paths 36 includes a transmit signal shunt resonator 42 coupled in series with a transmit signal shunt inductor L_SHTX between one of the series intermediate nodes 40 and ground. Specifically, a first transmit signal shunt resonator 42A is coupled in series with a first transmit signal shunt inductor L_SHTX1 between a first series intermediate node 40A and ground, and a last transmit signal shunt resonator 42N is coupled in series with a last transmit signal shunt inductor L_SHTXN between a last series intermediate node 40N and ground.

The receive signal filtering circuitry 30 similarly includes a number of acoustic resonators coupled together in a ladder configuration on a receive signal filtering circuitry acoustic die 44. Specifically, the receive signal filtering circuitry acoustic die 44 includes a series receive signal filter path 46 coupled between the receive signal path coupler inductor L_CRX and the duplexer common node 26A, and a number of shunt receive signal filter paths 48 coupled between the series receive signal filter path 46 and ground. The series receive signal filter path 46 includes a number of receive signal series resonators 50 each including an input node and an output node and coupled in series such that an input node of a first one of the receive signal series resonators 50A is coupled to the duplexer common node 26A, an output node of a last one of the receive signal series resonators 50N is coupled to the receive signal path coupler inductor L_CRX, and a connection between each adjacent pair of the receive signal series resonators 50 provides a series intermediate node 52, such that the number of series intermediate nodes 52 is one less than the number of receive signal series resonators 50.

Each one of the shunt receive signal filter paths 48 includes a receive signal shunt acoustic resonator 54 coupled in series with a receive signal shunt inductor L_SHRX between one of the series intermediate nodes 52 and ground. Specifically, a first receive signal shunt acoustic resonator 54A is coupled in series with a first receive signal shunt inductor L_SHRX1 between a first intermediate node 52A and ground, and a last receive signal shunt acoustic resonator 54N is coupled in series with a last receive signal shunt inductor L_SHRXN between a last intermediate node 52N and ground.

The various components of the transmit signal filtering circuitry 28 are chosen such that a filter response thereof passes RF transmit signals within a desired RF operating band while attenuating other signals. Similarly, the various components of the receive signal filtering circuitry 30 are chosen such that a filter response thereof passes RF receive signals within the same RF operating band while attenuating other signals. Generally, the largest blocker signals for the receive signal filtering circuitry 30 are the RF transmit signals passed by the transmit signal filtering circuitry 28, which may be unintentionally coupled into the signal path of the receive signal filtering circuitry 30 and cause desensitization of downstream receiver circuitry. Accordingly, it is a primary objective of the conventional duplexer 24 to isolate the RF transmit signals from the signal path of the receive signal filtering circuitry 30. In situations in which multiple RF carriers are used to receive a signal, the difficulty of isolating the RF transmit signals from the signal path of the receive signal filtering circuitry 30 may increase, as discussed with respect to FIG. 3.

FIG. 3 is a diagram illustrating a transmit and receive configuration for a wireless communications device in which primary RF transmit signals within a transmit signal frequency band are transmitted and both primary RF receive signals and secondary RF receive signals within a receive signal frequency band are received (i.e., downlink carrier aggregation). The transmit signal frequency band and the receive signal frequency band form an RF operating band. The RF operating band may be, for example, a Long Term Evolution (LTE) operating band. As will be appreciated by those skilled in the art, it is the job of the conventional duplexer 24 to separate the primary RF transmit signals from the primary RF receive signals and the secondary RF receive signals. As shown in FIG. 3, the secondary RF receive signal is closer to the transmit signal frequency band than the primary RF receive signal. Because of this fact, the primary RF transmit signals will disproportionately affect the secondary RF receive signals, as signals become more difficult to separate the closer in frequency they become. Accordingly, the secondary RF receive signals may require additional attenuation with respect to the primary RF transmit signals. Conventional RF filtering circuitry such as the conventional duplexer 24 generally provides uniform attenuation across the entirety of a transmit signal frequency band and a receive signal frequency band. While this attenuation may be increased to reduce the effect of the primary RF transmit signals on the secondary RF receive signals, the additional attenuation comes at the cost of increased insertion loss and may otherwise decrease the performance of the conventional duplexer 24.

In light of the issues identified above, there has been a trend towards providing tunable RF filtering circuitry in which the attenuation provided across the transmit signal frequency band, the receive signal frequency band, or both are adjustable as desired. Such tunable RF filtering circuitry may be useful, for example, in the situation discussed above with respect to FIG. 3, as the attenuation of the RF transmit signals in the receive signal path may be increased when a secondary carrier is used. However, there are serious design challenges associated with creating tunable RF filtering circuitry. Those conventional designs that do provide adjustability of RF filtering circuitry often do so at the cost of increased area, increased insertion loss, degraded out-of-band response, and the like. Accordingly, there is a need for improved RF filtering circuitry, and in particular for RF filtering circuitry with improved attenuation of RF transmit signals in an RF receive path.

SUMMARY

The present disclosure relates to RF filtering circuitry, and in particular to RF filtering circuitry with improved attenuation of radio frequency (RF) transmit signals in an RF receive signal path. In one embodiment, RF filtering circuitry includes a common node, a transmit signal node, and a receive signal node. Transmit signal filtering circuitry is coupled between the transmit signal node and the common node, and is configured to pass RF transmit signals within a transmit signal frequency band between the transmit signal node and the common node while attenuating signals outside of the transmit signal frequency band. The transmit signal filtering circuitry may include a series transmit signal filter path, a shunt transmit signal filter path, and a tuning impedance. The series transmit signal filter path may include at least one transmit signal series resonator. The shunt transmit signal filter path may include a transmit signal shunt resonator and a shunt impedance coupled in series between the series transmit signal filter path and a fixed voltage, and may provide a shunt intermediate node at the connection between the transmit signal shunt resonator and the shunt impedance. The tuning impedance may be coupled between the transmit signal node and the shunt intermediate node. Receive signal filtering circuitry is coupled between the receive signal node and the common node, and is configured to pass RF receive signals within a receive signal frequency band while attenuating signals outside of the receive signal frequency band. By coupling the tuning impedance between the transmit signal node and the shunt intermediate node, the filter response of the RF filtering circuitry may be changed such that the attenuation of the RF transmit signals in a signal path of the receive signal filtering circuitry is increased over a portion of the receive signal frequency band without significantly affecting the insertion loss of the RF filtering circuitry.

In one embodiment, the transmit signal filter path includes a number of transmit signal series resonators, each including an input node and an output node and coupled in series such between the transmit signal node and the common node such that an input node of a first one of the transmit signal series resonators is coupled to the transmit signal node, an output node of a last one of the transmit signal series resonators is coupled to the common node, and a connection between each adjacent pair of transmit signal series resonators provides a series intermediate node. In such an embodiment, the shunt transmit signal filter path is coupled between one of the series intermediate nodes and the fixed voltage. The shunt transmit signal filter path may be coupled between a first series intermediate node and the fixed voltage, where the first series intermediate node is located closest to the transmit signal node.

In one embodiment, the RF filtering circuitry further includes control circuitry configured to adjust the impedance of the tuning impedance such that in a first mode of operation, the attenuation of RF transmit signals within the transmit signal frequency band is greater in a first portion of the receive signal frequency band than in a second portion of the receive signal frequency band and in a second mode of operation, the attenuation of RF transmit signals within the transmit signal frequency band is greater in the second portion of the receive signal frequency band than in the first portion of the receive signal frequency band.

Those skilled in the art will appreciate the scope of the disclosure and realize additional aspects thereof after reading the following detailed description in association with the accompanying drawings.

BRIEF DESCRIPTION OF THE DRAWINGS

The accompanying drawings incorporated in and forming a part of this specification illustrate several aspects of the disclosure, and together with the description serve to explain the principles of the disclosure.

DETAILED DESCRIPTION

The embodiments set forth below represent the necessary information to enable those skilled in the art to practice the disclosure and illustrate the best mode of practicing the disclosure. Upon reading the following description in light of the accompanying drawings, those skilled in the art will understand the concepts of the disclosure and will recognize applications of these concepts not particularly addressed herein. It should be understood that these concepts and applications fall within the scope of the disclosure and the accompanying claims.

Figure 4:
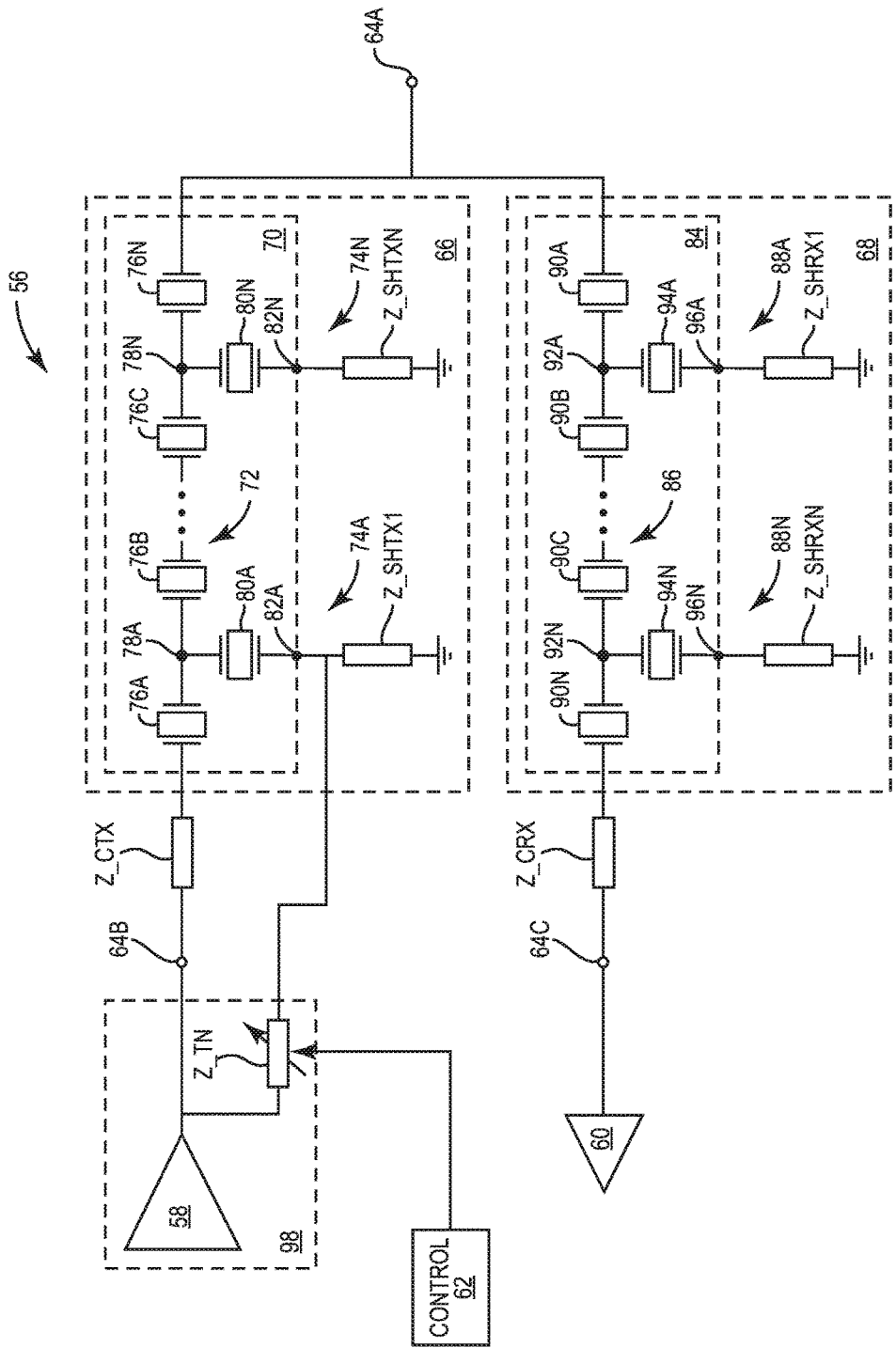
FIG. 4 is a functional schematic illustrating RF filtering circuitry according to one embodiment of the present disclosure.

FIG. 4 shows RF filtering circuitry 56 according to one embodiment of the present disclosure. For context, an RF power amplifier 58, a low-noise amplifier 60, and filter control circuitry 62 are also shown. The RF filtering circuitry 56 includes a common node 64A, a duplexer transmit signal node 64B, and a duplexer receive signal node 64C. The duplexer transmit signal node 64B is coupled to an output of the RF power amplifier 58. The duplexer receive signal node 64C is coupled to an input of the low-noise amplifier 60. Transmit signal filtering circuitry 66 is coupled in series with a transmit signal path coupler impedance Z_CTX between the duplexer transmit signal node 64B and the common node 64A, such that the transmit signal path coupler impedance Z_CTX is coupled to the duplexer transmit signal node 64B and the transmit signal filtering circuitry 66 is coupled between the transmit signal path coupler impedance Z_CTX and the common node 64A. Receive signal filtering circuitry 68 is coupled in series with a receive signal path coupler impedance Z_CRX between the duplexer receive signal node 64C and the common node 64A, such that the receive signal path coupler impedance Z_CRX is coupled to the duplexer receive signal node 64C and the receive signal filtering circuitry 68 is coupled between the receive signal path coupler impedance Z_CRX and the common node 64A.

The transmit signal filtering circuitry 66 includes a number of acoustic resonators coupled together in a ladder configuration on a transmit signal filtering acoustic die 70. Specifically, the transmit signal filtering acoustic die 70 includes a series transmit signal filter path 72 coupled between the transmit signal path coupler impedance Z_CTX and the common node 64A, and a number of shunt transmit signal filter paths 74 coupled between the series transmit signal filter path 72 and ground. The series transmit signal filter path 72 includes a number of transmit signal series resonators 76 each including an input node and an output node and coupled in series such that an input node of a first one of the transmit signal series resonators 76A is coupled to the transmit signal path coupler impedance Z_CTX, an output node of a last one of the transmit signal series resonators 76N is coupled to the common node 64A, and a connection between each adjacent pair of the transmit signal series resonators 76 provides a series intermediate node 78. In one embodiment, the number of series intermediate nodes 78 is one less than the number of transmit signal series resonators 76.

Each one of the shunt transmit signal filter paths 74 includes a transmit signal shunt resonator 80 coupled in series with a transmit signal shunt impedance Z_SHTX between one of the series intermediate nodes 78 and ground such that the connection between the transmit signal shunt resonator 80 and the transmit signal shunt impedance Z_SHTX provides a shunt intermediate node 82. Specifically, a first transmit signal shunt resonator 80A is coupled in series with a first transmit signal shunt impedance Z_SHTX1 between a first intermediate node 78A and a fixed voltage (e.g., ground) and provides a first shunt intermediate node 82A, and a last transmit signal shunt resonator 80N is coupled in series with a last transmit signal shunt impedance Z_SHTXN between a last intermediate node 78N and a fixed voltage (e.g., ground) and provides a last shunt intermediate node 82N.

A tuning impedance Z_TN may be coupled between the duplexer transmit signal node 64B and the first shunt intermediate node 82A. The impedance of the tuning impedance Z_TN may be adjustable in order to tune the operation of the RF filtering circuitry 56 as discussed in detail below. The filter control circuitry 62 may be coupled to the tuning impedance Z_TN and configured to adjust the impedance thereof to a desired value.

The receive signal filtering circuitry 68 similarly includes a number of acoustic resonators coupled together in a ladder configuration on a receive signal filtering circuitry acoustic die 84. Specifically, the receive signal filtering circuitry acoustic die 84 includes a series receive signal filter path 86 coupled between the receive signal path coupler impedance Z_CRX and the common node 64A, and a number of shunt receive signal filter paths 88 coupled between the series receive signal filter path 86 and ground. The series receive signal filter path 86 includes a number of receive signal series resonators 90 each including an input node and an output node and coupled in series such that an input node of a first one of the receive signal series resonators 90A is coupled to the common node 64A, an output node of a last one of the receive signal series resonators 90N is coupled to the receive signal path coupler impedance Z_CRX, and a connection between each adjacent pair of the receive signal series resonators 90 provides a series intermediate node 92. In one embodiment, the number of series intermediate nodes 92 is one less than the number of receive signal series resonators 90.

Each one of the shunt receive signal filter paths 88 includes a receive signal shunt resonator 94 coupled in series with a receive signal shunt impedance Z_SHRX between one of the series intermediate nodes and ground such that the connection between the receive signal shunt resonator 94 and the receive signal shunt impedance Z_SHRX provides a shunt intermediate node 96. Specifically, a first receive signal shunt resonator 94A is coupled in series with a first receive signal shunt impedance Z_SHRX1 between a first shunt intermediate node 92A and a fixed voltage (e.g., ground) and provides a first shunt intermediate node 96A, and a last receive signal shunt resonator 94N is coupled in series with a last receive signal shunt impedance Z_SHRXN between a last shunt intermediate node 92N and a fixed voltage (e.g., ground) and provides a second shunt intermediate node 96N.

The various components of the transmit signal filtering circuitry 66 are chosen such that a filter response thereof passes RF transmit signals (i.e., RF signals located within a transmit signal frequency band of a desired RF operating band) while attenuating other signals (specifically those outside of the transmit signal frequency band). Similarly, the various components of the receive signal filtering circuitry 68 are chosen such that a filter response thereof passes RF receive signals (i.e., RF signals located within a receive signal frequency band of the desired RF operating band) while attenuating other signals (specifically those outside of the receive signal frequency band). In other words, the RF filtering circuitry 56 is a duplexer. However, the present disclosure is not so limited. The principles of the present disclosure may be applied to any RF filtering circuitry in which blocker signals provided over a first signal path need to be attenuated on a second signal path, such as diplexers, multiplexers, and the like.

Figure 1:
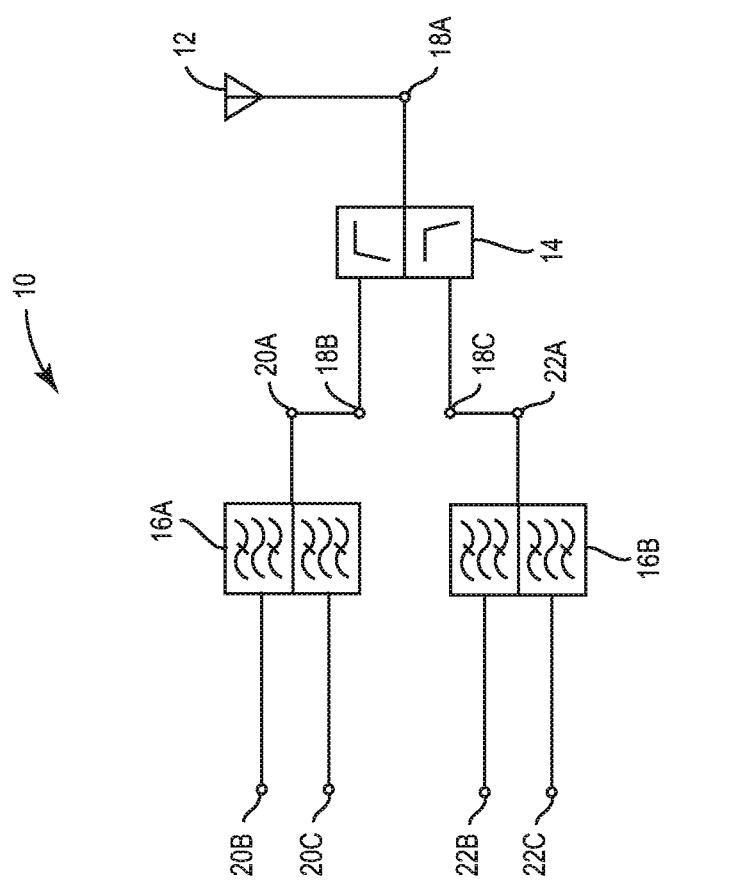
FIG. 1 is a functional schematic illustrating conventional radio frequency (RF) front end circuitry.
Figure 2:
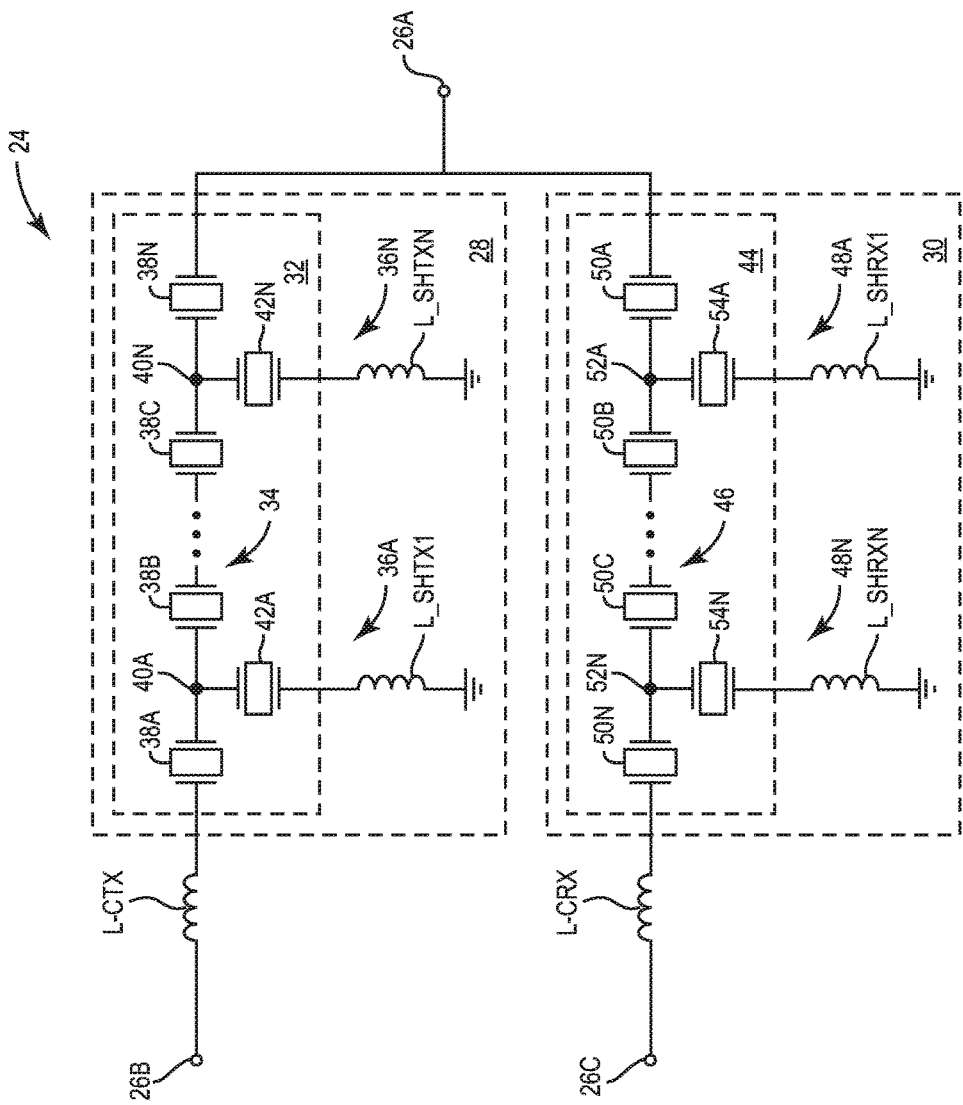
FIG. 2 is a functional schematic illustrating a conventional duplexer.
Figure 3:
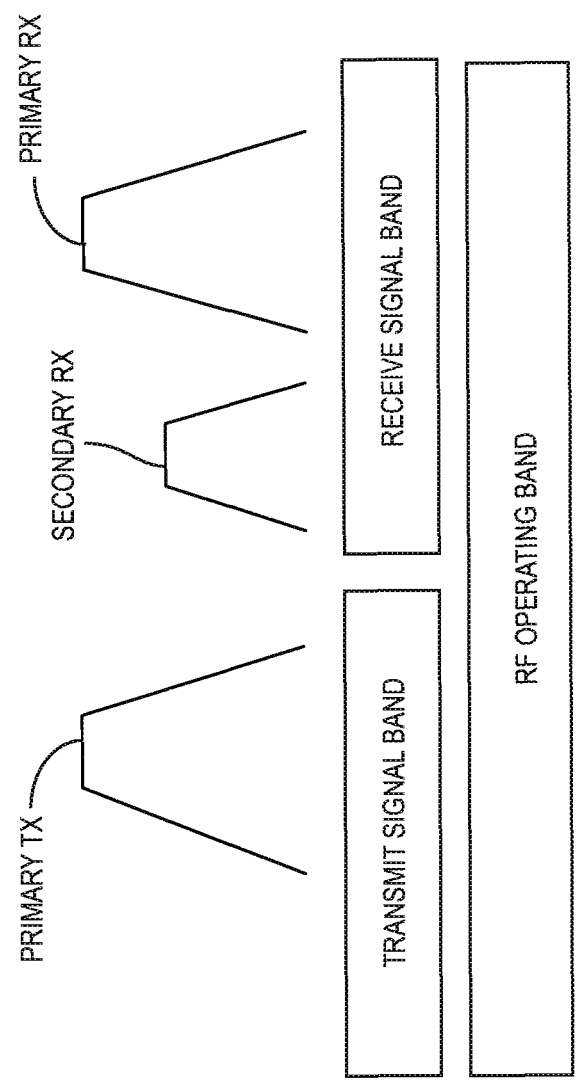
FIG. 3 is a diagram illustrating a transmit and receive configuration for a wireless communications device.

As discussed above, the largest blocker signals experienced by the receive signal filtering circuitry 68 are generally the RF transmit signals passed via the transmit signal filtering circuitry 66. The RF transmit signals may couple into the signal path of the receive signal filtering circuitry 68 and desensitize the low-noise amplifier 60 if they are not properly dealt with. As discussed above with respect to FIG. 3, RF receive signals within the receive signal frequency band that are closer to the transmit signal frequency band may experience a disproportional impact from the RF transmit signals, and thus additional attenuation may be required at those frequencies within the receive signal frequency band that are closer to the transmit signal frequency band.

Generally, there is a tradeoff between RF transmit signal isolation and insertion loss for the receive signal filtering circuitry 68. That is, while increasing the isolation of RF transmit signals within the receive signal filtering circuitry 68 may reduce the impact of the RF transmit signals on those RF receive signals located near the transmit portion of the RF frequency band, it will also increase the insertion loss of the RF filtering circuitry 56. Accordingly, the tuning impedance Z_TN is provided in order to tune the RF filtering circuitry 56. By changing the impedance of the tuning impedance Z_TN, the attenuation of RF transmit signals within a first portion of the receive signal frequency band is increased without affecting the attenuation of the RF transmit signals within a second portion of the receive signal frequency band. The first portion of the receive signal frequency band may be closer to the transmit signal frequency band, while the second portion of the receive signal frequency band may be further from the transmit signal frequency band. In one embodiment, the receive signal frequency band is equally divided into a first portion and a second portion, however, the first portion of the receive signal frequency band and the second portion of the receive signal frequency band may comprise any amount of the receive signal frequency band. The tuning impedance Z_TN may be adjusted such that the attenuation of RF transmit signals is greater in the second portion of the receive signal frequency band than in the first portion of the receive signal frequency band. By adjusting the tuning impedance Z_TN such that the attenuation of the RF transmit signals is improved in only a portion of the receive signal frequency band, a better tradeoff between RF transmit signal isolation and insertion loss is achieved, thereby increasing the performance of the RF filtering circuitry 56.

In one embodiment, the filter control circuitry 62 is configured to adjust the impedance of the tuning impedance Z_TN such that the in a first mode of operation in which a secondary RF receive signal is received (see FIG. 3 above), the attenuation of the RF transmit signals is greater in the first portion of the receive signal frequency band than in the second portion of the receive signal frequency band. In a second mode of operation in which a secondary RF receive signal is not received, the attenuation of the RF transmit signals may be greater in the second portion of the receive signal frequency band than in the first portion of the receive signal frequency band. As discussed above, since the attenuation of the RF transmit signals is only increased over a portion of the receive signal frequency band, the insertion loss of the RF filtering circuitry 56 may remain relatively unchanged.

The tuning impedance Z_TN may be any suitable impedance without departing from the principles of the present disclosure. For example, the tuning impedance Z_TN may be inductive, capacitive, resistive, or some combination thereof. In one embodiment, the tuning impedance Z_TN is a capacitor with a capacitance between 0.2 pF and 0.4 pF. The tuning impedance Z_TN may comprise multiple components such as a digital array of capacitors (DAC). The filter control circuitry 62 may operate one or more switches in the DAC in order to change the capacitance of the tuning impedance Z_TN in such an embodiment. Those skilled in the art will appreciate that many different components with an adjustable impedance may be provided for the tuning impedance Z_TN, all of which are contemplated herein.

The transmit signal path coupler impedance Z_CTX and the receive signal path coupler impedance Z_CRX may be inductive, capacitive, resistive, or some combination thereof without departing from the principles of the present disclosure. Similarly, the transmit signal shunt impedances Z_SHTX and the receive signal shunt impedances Z_SHRX may also be inductive, capacitive, resistive, or some combination thereof.

While the transmit signal filtering circuitry 66 and the receive signal filtering circuitry 68 are shown including a particular number of resonators, the transmit signal filtering circuitry 66 and the receive signal filtering circuitry 68 may include any number of resonators without departing from the principles of the present disclosure. That is, the series transmit signal filter path 72 may include any number of transmit signal series resonators 76, and there may be any number of transmit signal shunt filter paths including any number of transmit signal shunt resonators 80. Further, the series receive signal filter path 86 may include any number of receive signal series resonators 90, and there may be any number of shunt receive signal filter paths 88 including any number of receive signal shunt resonators 94.

The resonators in the transmit signal filtering circuitry 66 and the receive signal filtering circuitry 68 may be any type of resonator. In one embodiment, the resonators are acoustic resonators, such as bulk acoustic wave (BAW) and surface acoustic wave (SAW) resonators. In other embodiments, the resonators may be lumped element resonators. Those skilled in the art will appreciate that many different types of resonators may be used in the transmit signal filtering circuitry 66 and the receive signal filtering circuitry 68, all of which are contemplated herein.

Figure 5:
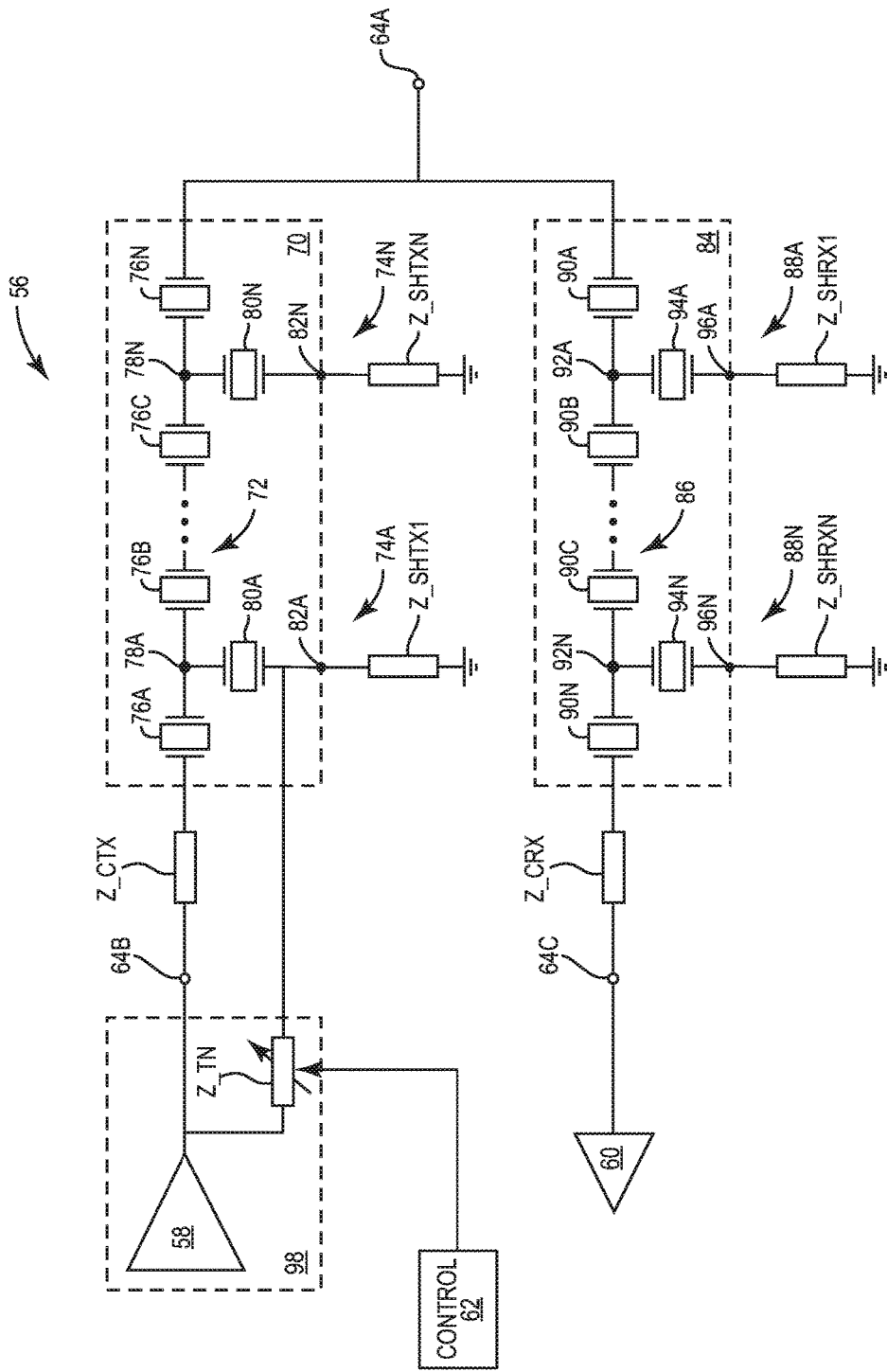
FIG. 5 is a functional schematic illustrating RF filtering circuitry according to one embodiment of the present disclosure.
Figure 6:
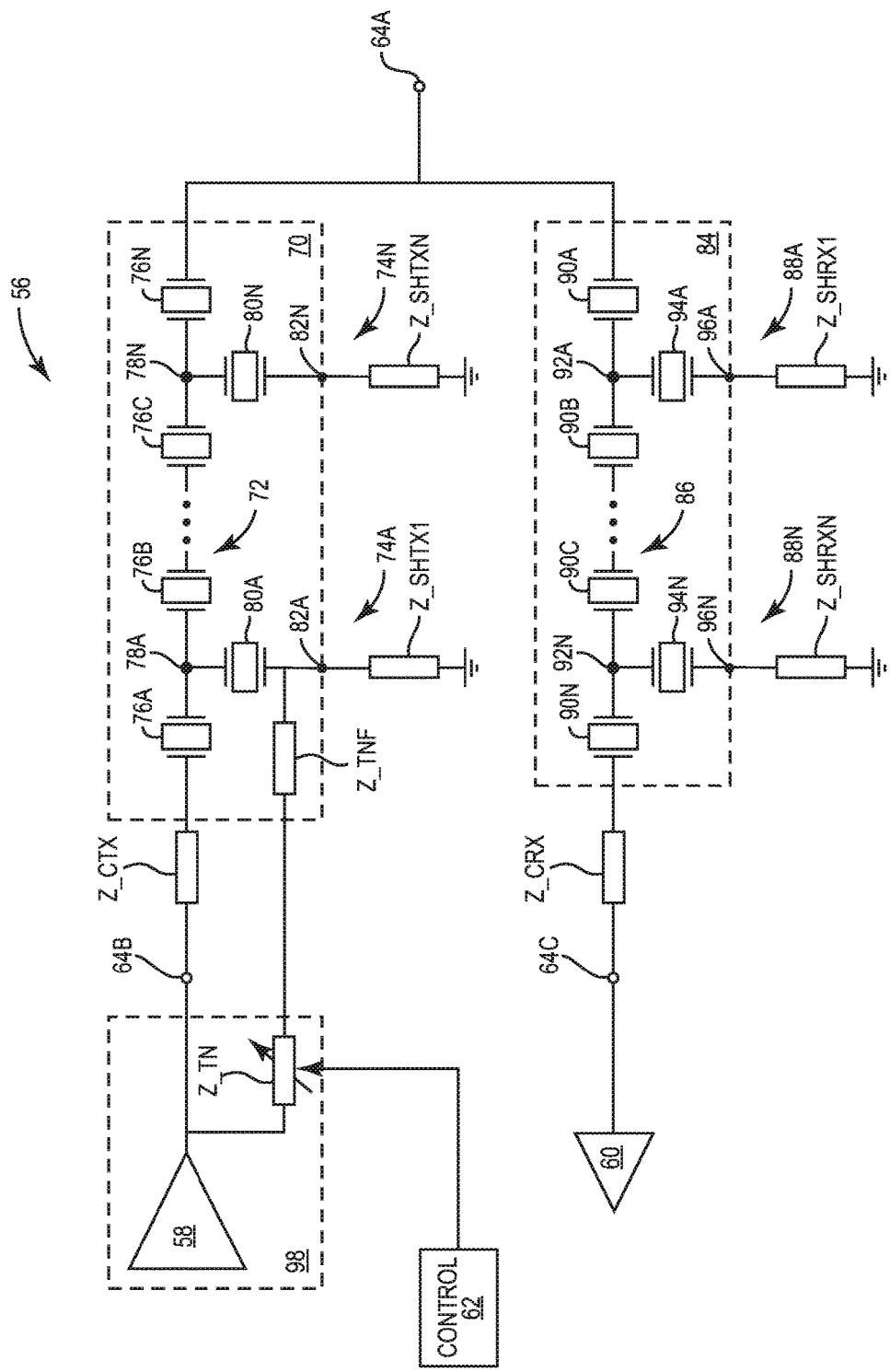
FIG. 6 is a functional schematic illustrating RF filtering circuitry according to one embodiment of the present disclosure.

While the tuning impedance Z_TN is part of the RF filtering circuitry 56, it is shown located on a power amplifier die 98 including the RF power amplifier 58. It may make sense to integrate the RF power amplifier 58 and the tuning impedance Z_TN in some cases due to similarities in fabrication technology. While the tuning impedance Z_TN is shown connecting to the first shunt intermediate node 82A, the tuning impedance Z_TN may be coupled to any shunt intermediate node without departing from the principles of the present disclosure. Further, while the tuning impedance Z_TN is shown coupled to the first shunt intermediate node 82A external to the transmit signal filtering acoustic die 70, the tuning impedance Z_TN may couple to the shunt intermediate node 82A internally on the transmit signal filtering acoustic die 70, as shown in FIG. 5. In such an embodiment, the transmit signal filtering acoustic die 70 may include an additional connector (e.g., a bond pad, a pin, etc.) to provide a connection point for the tuning impedance Z_TN. In some embodiments, the tuning impedance Z_TN may be coupled in series with a fixed tuning impedance Z_TNF between the duplexer transmit signal node 64B and the first shunt intermediate node 82A as shown in FIG. 6. In such embodiments, the tuning impedance Z_TN may be located on the power amplifier die 98 while the fixed tuning impedance Z_TNF may be located on the transmit signal filtering acoustic die 70. Providing the fixed tuning impedance Z_TNF along with the tuning impedance Z_TN may allow for a reduction in size of the tuning impedance Z_TN, which may result in a significant area reduction due to the tunable nature of the tuning impedance Z_TN.

Figure 7:
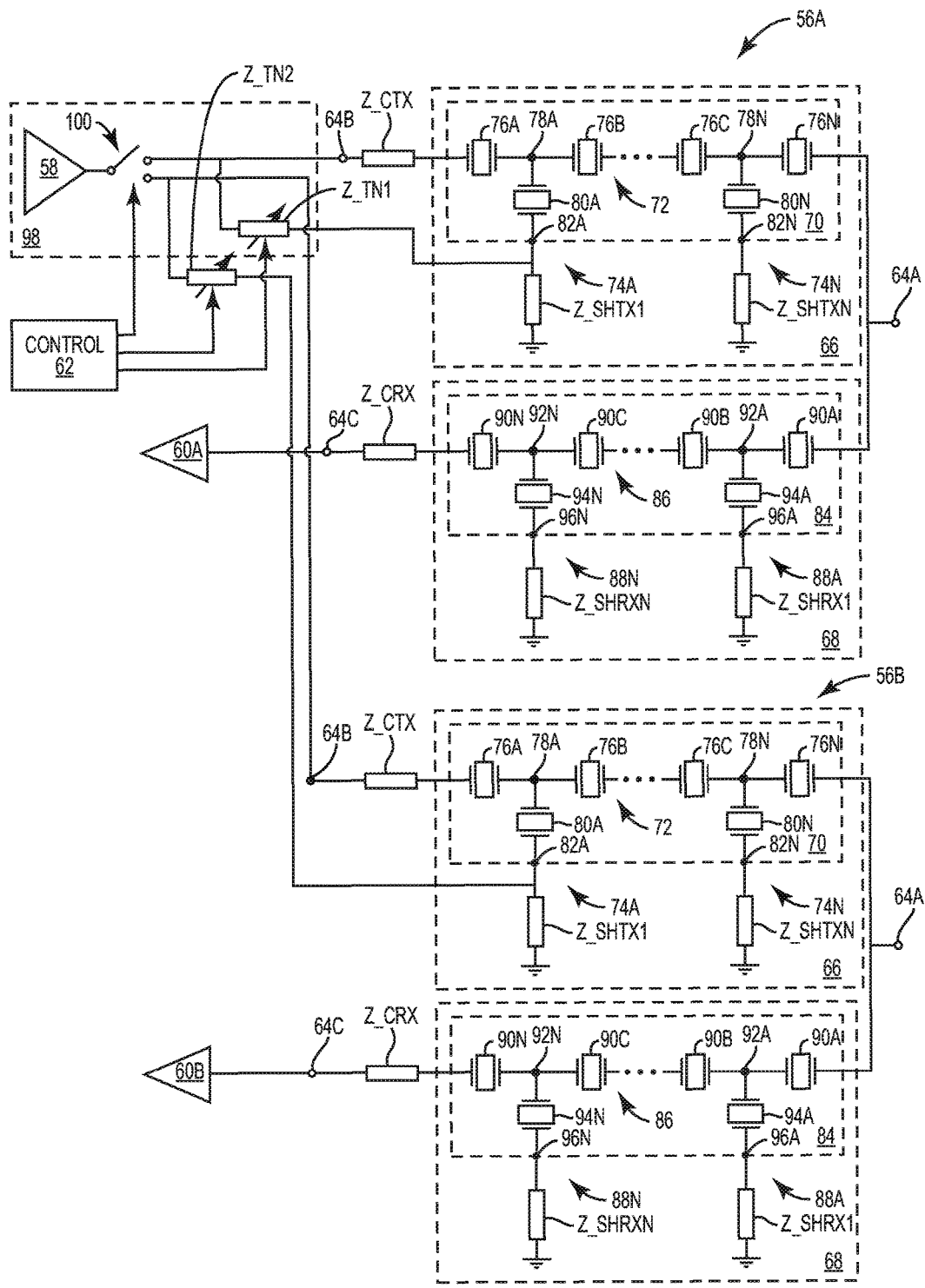
FIG. 7 is a functional schematic illustrating RF filtering circuitry according to one embodiment of the present disclosure.

FIG. 7 shows the RF filtering circuitry 56 according to an additional embodiment of the present disclosure. The RF filtering circuitry 56 shown in FIG. 7 is substantially similar to that shown in FIG. 4, but is divided into first RF filtering circuitry 56A and second RF filtering circuitry 56B. The components of the first RF filtering circuitry 56A and the second RF filtering circuitry 56B are substantially identical, and thus are labeled the same. In the embodiment shown in FIG. 7, the RF power amplifier 58 may be a multi-band RF power amplifier capable of providing RF transmit signals within a first RF operating band and a second RF operating band. The first RF filtering circuitry 56A may provide filtering for the first RF operating band, while the second RF filtering circuitry 56B may provide filtering for the second RF operating band. A first low-noise amplifier 60A is coupled to the duplexer receive signal node 64C of the first RF filtering circuitry 56A. A second low-noise amplifier 60B is coupled to the duplexer receive signal node 64C of the second RF filtering circuitry 56B.

The transmit signal node 64B of the first RF filtering circuitry 56A and the transmit signal node 64B of the second RF filtering circuitry 56B are both coupled to the RF power amplifier 58. Specifically, the first RF filtering circuitry 56A is coupled to a first output of the RF power amplifier 58, and the second RF filtering circuitry 56B is coupled to a second output of the RF power amplifier 58. The tuning impedance Z_TN is divided into a first tuning impedance Z_TN1, which is coupled between the duplexer transmit signal node 64B of the first RF filtering circuitry 56A and the first shunt intermediate node 82A of the first RF filtering circuitry, and a second tuning impedance Z_TN2, which is coupled between the duplexer transmit signal node 64B of the second RF filtering circuitry 56B and the first shunt intermediate node 82A of the second RF filtering circuitry 56B.

A power amplifier switch 100 is configured to connect the RF power amplifier 58 to one of the first power amplifier output and thus the first RF filtering circuitry 56A and the second power amplifier output and thus the second RF filtering circuitry 56B. The RF power amplifier 58 may be configured to provide RF transmit signals within the first RF operating band and RF transmit signals within the second RF operating band. When providing RF transmit signals within the first RF operating band, the filter control circuitry 62 is configured to operate the power amplifier switch 100 to couple the RF power amplifier 58 to the first power amplifier output and thus the first RF filtering circuitry 56A. Similarly, when providing RF transmit signals within the second RF operating band, the filter control circuitry 62 is configured to operate the power amplifier switch 100 to couple the RF power amplifier 58 to the second power amplifier output and thus the second RF filtering circuitry 56B.

The first RF filtering circuitry 56A is configured to separate RF transmit signals within the first RF operating band from RF receive signals within the first operating band, using the first tuning impedance Z_TN1 as discussed above to increase isolation of the RF transmit signals from the RF receive signals in different portions of the receive signal frequency band. Similarly, the second RF filtering circuitry 56B is configured to separate RF transmit signals within the second RF operating band from RF receive signals within the second RF operating band, using the second tuning impedance Z_TN2 as discussed above to increase isolation of the RF transmit signals from the RF receive signals in different portions of the receive signal frequency band. Using the topology illustrated in FIG. 7 allows for the transmission and reception of signals in both the first RF operating band and the second RF operating band using a single RF power amplifier, which may result in a reduction in the area of the circuitry.

Figure 8:
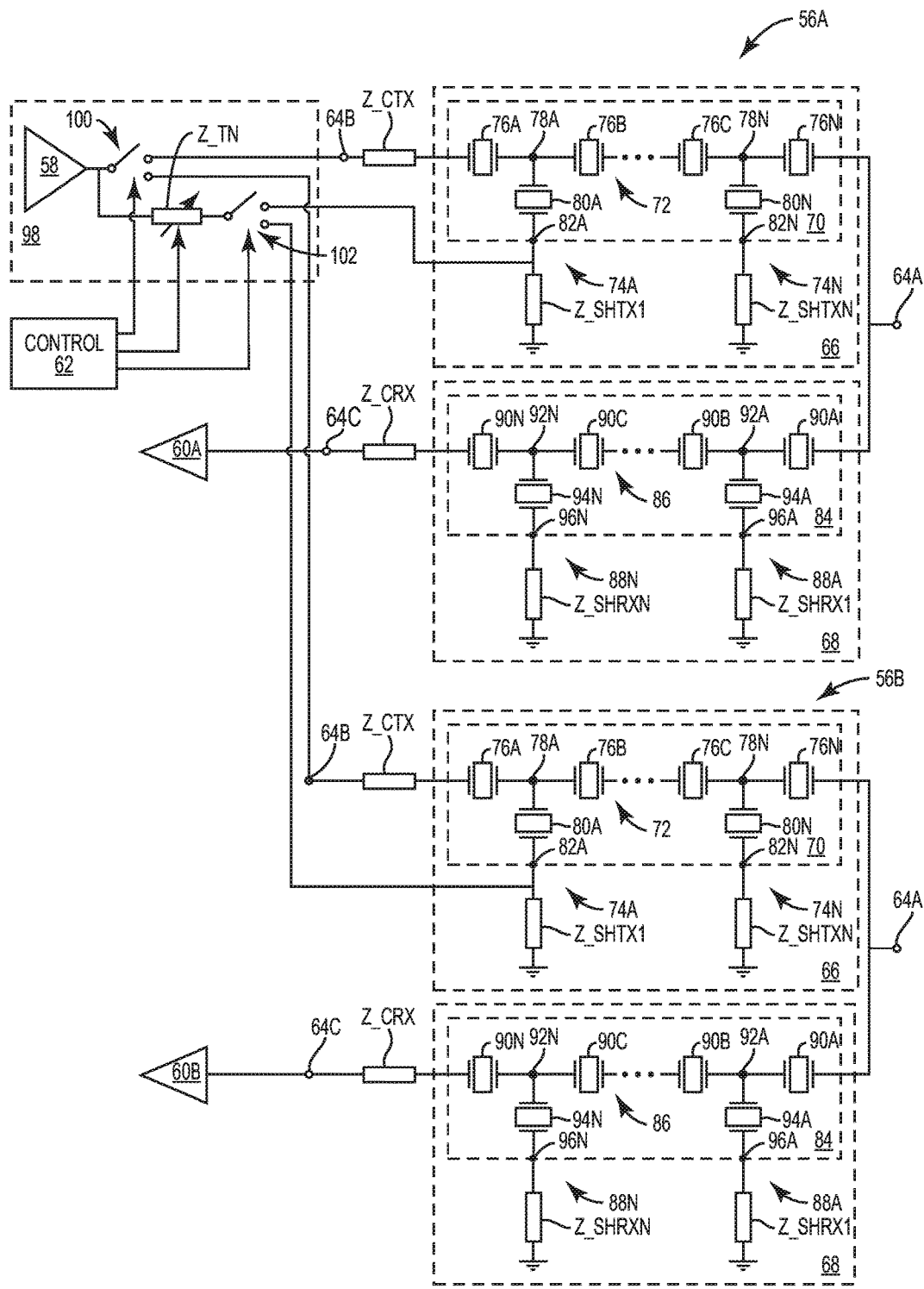
FIG. 8 is a functional schematic illustrating RF filtering circuitry according to one embodiment of the present disclosure.

FIG. 8 shows the RF filtering circuitry 56 shown in FIG. 7 according to an additional embodiment of the present disclosure. The RF filtering circuitry 56 shown in FIG. 8 is substantially similar to that shown in FIG. 7, except that the first tuning impedance Z_TN1 and the second tuning impedance Z_TN2 are combined into a single tuning impedance Z_TN, which is coupled between an output of the RF power amplifier 58 and a tuning impedance switch 102. The tuning impedance switch 102 is in turn coupled to the first shunt intermediate node 82A of the first RF filtering circuitry 56A and the first shunt intermediate node 82A of the second RF filtering circuitry 56B. The filter control circuitry 62 is configured to operate the tuning impedance switch 102 synchronously with the power amplifier switch 100, such that when the RF power amplifier 58 is providing RF transmit signals within the first RF operating band to the first RF filtering circuitry 56A the tuning impedance Z_TN is coupled to the first shunt intermediate node 82A of the first RF filtering circuitry 56A and when the RF power amplifier 58 is providing RF transmit signals within the second RF operating band to the second RF filtering circuitry 56B the tuning impedance Z_TN is coupled to the first shunt intermediate node 82A of the second RF filtering circuitry 56B. Accordingly, only a single tuning impedance Z_TN is required, thereby saving area in the circuitry.

Those skilled in the art will recognize improvements and modifications to the embodiments of the present disclosure. All such improvements and modifications are considered within the scope of the concepts disclosed herein and the claims that follow.

What is claimed is:

1. Radio frequency (RF) filtering circuitry comprising:
   a common node, a transmit signal node, and a receive signal node;
   transmit signal filtering circuitry coupled between the transmit signal node and the common node and configured to pass RF transmit signals within a transmit signal frequency band between the transmit signal node and the common node while attenuating signals outside of the transmit signal frequency band, the transmit signal filtering circuitry comprising:
      a series transmit signal filter path coupled between the transmit signal node and the common node, wherein the series transmit signal filter path comprises a plurality of transmit signal series resonators, each comprising an input node and an output node and coupled in series between the transmit signal node and the common node such that an input node of a first one of the plurality of transmit signal series resonators is coupled to the transmit signal node, an output node of a last one of the plurality of transmit signal series resonators is coupled to the common node, and a connection between each pair of adjacent transmit signal series resonators provides a series intermediate node;
      a shunt transmit signal filter path comprising a transmit signal shunt resonator and a shunt impedance coupled in series between an output node of the first one of the plurality of transmit signal series resonators and a fixed voltage such that the connection between the transmit signal shunt resonator and the shunt impedance provides a shunt intermediate node;
      at least one second shunt transmit signal filter path comprising a second transmit signal shunt resonator and a second shunt impedance coupled in series between the series transmit signal filter path and the fixed voltage independent from the shunt transmit signal filter path; and
      a tuning impedance coupled exclusively between the transmit signal node and the shunt intermediate node of the shunt transmit signal filter path independent from the series transmit signal filter path and the shunt transmit signal filter path; and
   receive signal filtering circuitry coupled between the receive signal node and the common node and configured to pass RF receive signals within a receive signal frequency band while attenuating signals outside the receive signal frequency band.

2. The RF filtering circuitry of claim 1 wherein the at least one second shunt transmit signal filter path is coupled between an input node of the last one of the plurality of transmit signal series resonators and the shunt intermediate node.

3. The RF filtering circuitry of claim 1 wherein an impedance of the tuning impedance is adjustable.

4. The RF filtering circuitry of claim 3 further comprising control circuitry configured to adjust the impedance of the tuning impedance such that:
   in a first mode of operation, attenuation of the RF transmit signals within the transmit signal frequency band is greater in a first portion of the receive signal frequency band than in a second portion of the receive signal frequency band; and
   in a second mode of operation, attenuation of the RF transmit signals within the transmit signal frequency band is greater in the second portion of the receive signal frequency band than in the first portion of the receive signal frequency band.

5. The RF filtering circuitry of claim 4 wherein the tuning impedance is a capacitor.

6. The RF filtering circuitry of claim 5 wherein a capacitance of the tuning impedance is between 0.2 pF and 0.4 pF.

7. The RF filtering circuitry of claim 4 wherein each one of the plurality of transmit signal series resonators and the transmit signal shunt resonator are acoustic resonators.

8. The RF filtering circuitry of claim 4 wherein the shunt impedance is an inductor.

9. The RF filtering circuitry of claim 1 wherein each one of the plurality of transmit signal series resonators and the transmit signal shunt resonator are acoustic resonators.

10. The RF filtering circuitry of claim 1 wherein the shunt impedance is an inductor.

11. The RF filtering circuitry of claim 1 wherein the tuning impedance is a capacitor.

12. The RF filtering circuitry of claim 11 wherein a capacitance of the tuning impedance is between 0.2 pF and 0.4 pF.

* * * * *